(12) United States Patent
Luetzow et al.

(10) Patent No.: US 6,755,590 B1
(45) Date of Patent: Jun. 29, 2004

(54) BOX TUBE CLAMPING SYSTEM

(75) Inventors: Edwin J. Luetzow, Brookings, SD (US); Richard L. Luetzow, Brookings, SD (US)

(73) Assignee: MTR, Inc., Brookings, SD (US)

( * ) Notice: Subject to any disclaimer, the term of this patent is extended or adjusted under 35 U.S.C. 154(b) by 0 days.

(21) Appl. No.: 10/162,958

(22) Filed: Jun. 4, 2002

(51) Int. Cl.$^7$ .................................................. F16B 7/10
(52) U.S. Cl. ..................... 403/374.3; 403/6; 403/109.1; 403/109.5; 403/370; 403/367; 403/DIG. 9
(58) Field of Search .................................. 403/195, 196, 403/370, 373, 374.1–374.4, 409.1, DIG. 9, 6, 83, 109.1, 109.4, 109.5, 204, 377, 365, 366, 367; 248/188.5; 285/421, 420, 341, 339

(56) References Cited

U.S. PATENT DOCUMENTS

| | | | | |
|---|---|---|---|---|
| 3,680,619 A | * | 8/1972 | Sparks | ........................ 411/134 |
| 3,958,888 A | * | 5/1976 | Mullenberg | ................. 403/370 |
| 4,078,276 A | * | 3/1978 | Nunes | ......................... 403/370 |
| 5,779,388 A | * | 7/1998 | Yamamoto | ............... 403/374.1 |

* cited by examiner

Primary Examiner—Lynne H. Browne
Assistant Examiner—Victor MacArthur
(74) Attorney, Agent, or Firm—Hugh D. Jaeger

(57) ABSTRACT

A box tube clamping system featuring a variable geometry clamp for secure joining of telescoping box tubes. A variable geometry clamp aligns between an inner and an outer box tube and includes a center wedge plate flanked by adjoining wedge plates which are advanced towards the center wedge plate to force the center wedge plate in an upward direction to force the outer box tube and the inner box tube into forced and secure intimate frictional engagement. Installation spacers are included for use with the variable geometry clamp to provide user friendly accommodation of an inner box tube past and along the variable geometry clamp mounted in one end of the outer box tube.

8 Claims, 9 Drawing Sheets

BOX TUBE CLAMPING SYSTEM

CROSS REFERENCE TO RELATED APPLICATIONS

BACKGROUND OF THE INVENTION

1. Field of the Invention

The present invention is for a clamping system and, more particularly, is for a system including a variable geometry clamp joining telescoping box tubes, such as for gate arms.

2. Description of the Prior Art

Prior art clamping systems for gate arms were bolted together. The amount of time for assembly in the field was sometimes significant, because it was necessary to drill holes. In later years, the clamping systems came with predrilled holes, but sometimes the predrilled holes did not always align or were not drilled for the proper distances.

The present invention overcomes the problems with the prior art assembly of clamping systems for gate arms by providing a box tube clamping system. SUMMARY OF THE INVENTION The general purpose of the present invention is to provide a box tube clamping system including telescoping box tubes and an interceding variable geometry clamp. Such joined box tubes can be used for railroad grade crossing arms, parking lot security arms, or other situations requiring the attachment of box tubes or arms along a longitudinal axis. An outer box tube telescopingly accommodates an inner box tube of slightly lesser dimension. The outer box tube and the inner box tube are dimensioned such that substantially planar portions of a variable geometry clamp can be accommodated between the lower planar panels of each of the box tubes. The lower panel of the larger of the box tubes includes an elongated hole through which vertically oriented posts of the variable geometry clamp protrude. The variable geometry clamp is comprised of a center wedge assembly flanked by a left wedge assembly and a right wedge assembly. Each wedge assembly includes a wedge plate having opposing bevels and a holed post extending downwardly from the bottom surface thereof. An upwardly facing bevel of the left wedge plate and an upwardly facing bevel of the right wedge plate align intimately in edge to edge, bevel to bevel, horizontal fashion to oppositely oriented downwardly facing bevels of the center wedge plate. A bolt extending through the holes in the downwardly extending posts is incorporated to draw the left and right beveled wedge plates of the left and right wedge assemblies together against the center wedge plate of the center wedge assembly to alter the geometry of the clamp by causing forced upward deflection of the center wedge assembly by action of the impinging bevels. Such a change to the vertical extent of the variable geometry clamp forces mutual frictional and secure engagement of the inner box tube and the outer box tube.

According to one embodiment of the present invention, there is provided a box tube clamping system for secure joining of telescoping outer nad inner box tubes.

An alternate embodiment discloses installation spacers in the variable geometry clamp which aid in insertion of the inner box tube into the outer box tube.

One significant aspect and feature of the present invention is a box tube clamping system having a variable geometry clamp disposed between like planar panels of telescoping box tubes.

Another significant aspect and feature of the present invention is a variable geometry clamp having a center wedge assembly disposed between adjoining wedge assemblies.

Still another significant aspect and feature of the present invention is the use of wedge assemblies having beveled wedge plates and holed posts extending downward therefrom.

Yet another significant aspect and feature of the present invention is the intimate horizontal alignment of beveled surfaces of the beveled wedge plates.

A further significant aspect and feature of the present invention is the forcing together of adjoining wedge assemblies of the variable geometry clamp to vary the vertical extents of the variable geometry clamp to force mutual frictional engagement of the inner box tube with the outer box tube.

Still another significant aspect and feature of the present invention is the use of installation spacers with a variable clamp assembly which maintains a low and orderly variable clamp assembly profile to aid in the installation of the inner box tube within the outer box tube.

Having thus described embodiments of the present invention and mentioned several significant aspects and features thereof, it is the principal object of the present invention to provide a box tube clamping system.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
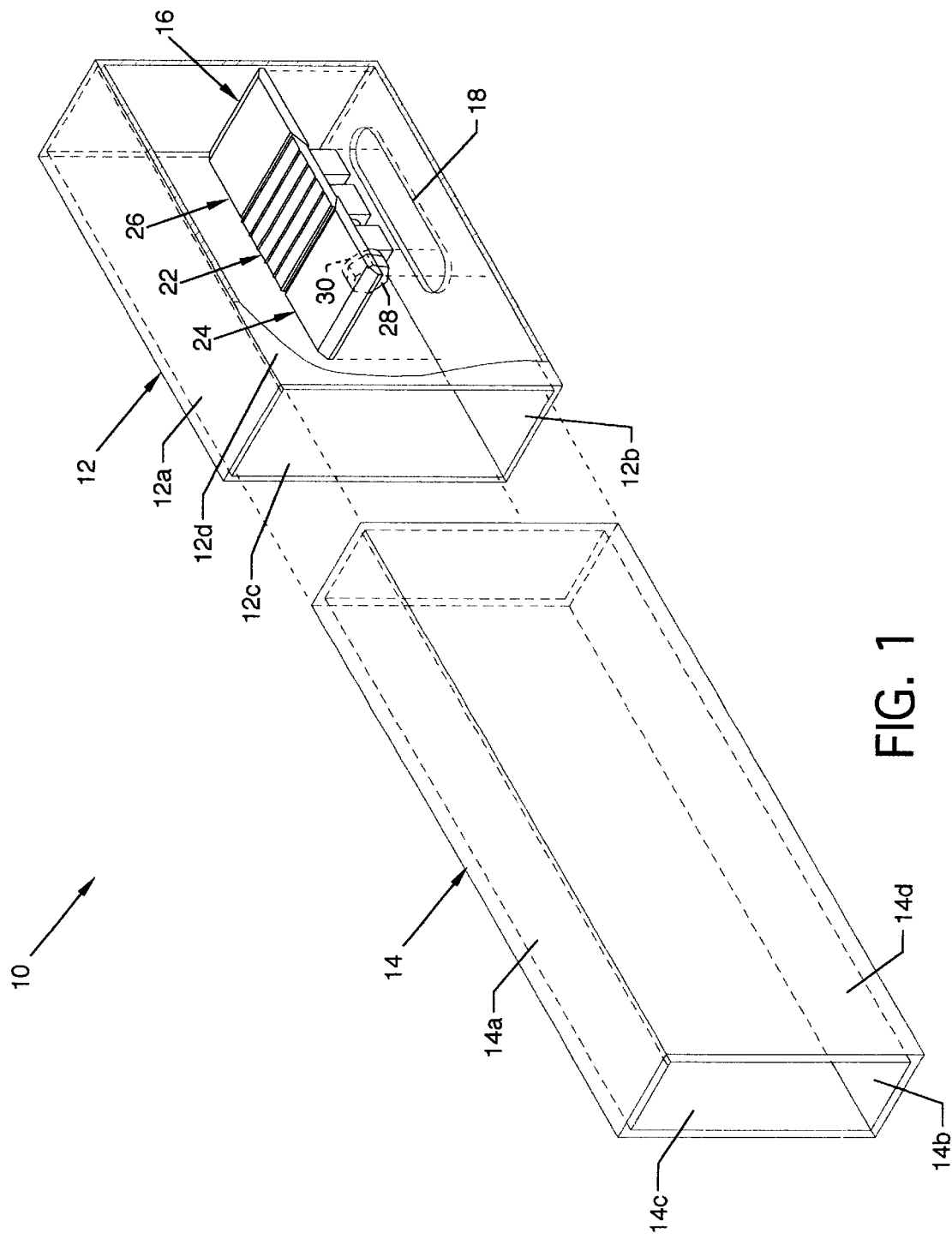
FIG. 1 illustrates an exploded isometric view of the box tube clamping system, the present invention.

FIG. 1 illustrates an exploded isometric view of the box tube clamping system 10 including an outer box tube 12, an inner box tube 14 which is telescopingly accommodated by the outer box tube 12, and a variable geometry clamp 16. The outer box tube 12, which preferably is open ended, includes upper and lower opposed panels 12a and 12b and opposed side panels 12c and 12d. An elongated hole 18 is included in the lower panel 12b. The inner box tube 14 includes upper and lower opposed panels 14a and 14b and opposed side panels 14c and 14d. The greater and substantially planar portions of variable geometry clamp 16 align to the lower panel 12b and within the confines of the outer box tube 12, while the lower vertically oriented portions of the variable geometry clamp 16 extend through and beyond the elongated hole 18 in the lower panel 12b of the outer box tube 12. The variable geometry clamp 16 is comprised of a center wedge assembly 22, adjoining left and right wedge assemblies 24 and 26, and a bolt 28 and lockwasher 30, as described later in detail with reference to FIG. 2.

Figure 2:
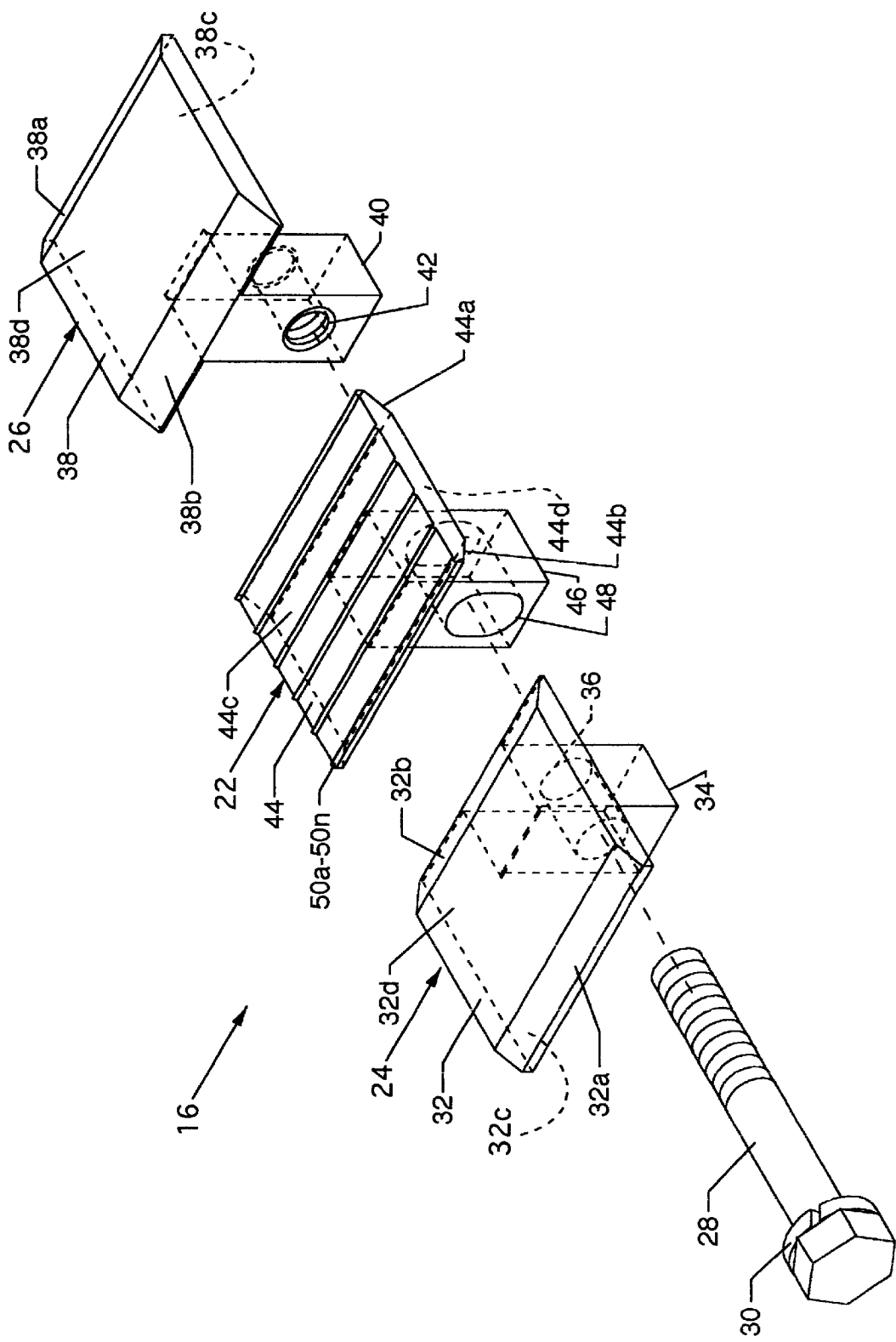
FIG. 2 illustrates an exploded isometric view of the variable geometry clamp.

FIG. 2 illustrates an exploded isometric view of the variable geometry clamp 16. The left wedge assembly 24 includes a wedge plate 32 having a transversely aligned upwardly facing bevel 32a opposed to a transversely aligned upwardly facing bevel 32b. The wedge plate 32 also includes a bottom surface 32c and a top surface 32d. A post 34 including a longitudinally oriented body hole 36 is located off center with respect to the wedge plate 32. One side of the post 34 aligns to the lower edge of the bevel 32b and extends downwardly from the lower edge of the bevel 32b and from the bottom surface 32c of the wedge plate 32b.

The right wedge assembly 26 includes a wedge plate 38 having a transversely aligned upwardly facing bevel 38a opposed to a transversely aligned upwardly facing bevel 38b. The wedge plate 38 also includes a bottom surface 38c and a top surface 38d. A post 40 including a longitudinally oriented threaded hole 42 is located off center with respect to the wedge plate 38. One side of the post 40 aligns to the lower edge of the bevel 38b and extends downwardly from the lower edge of the bevel 38b and from the bottom surface 38c of the wedge plate 38.

The center wedge assembly 22 includes a wedge plate 44 having a transversely aligned downwardly facing bevel 44a opposed to a transversely aligned downwardly facing bevel 44b. The wedge plate 44 also includes a top surface 44c and a bottom surface 44d. A post 46 including a longitudinally oriented elongated body hole 48 is located at the center of the wedge plate 44 and extends downwardly from the bottom surface 44d of the wedge plate 44. A plurality of gripping ridges 50a–50n are located along and about the top surface 44c of the wedge plate 44 to facilitate and enhance frictional engagement of the center wedge assembly 22 with the lower panel 14b of the inner box tube 14. The post 34 of the left wedge assembly 24 is oriented towards the post 46 of the center wedge assembly 22 and the post 40 of the right wedge assembly 26 is oriented towards the post 46 of the center wedge assembly 22 for best stabilization and alignment of the components of the variable geometry clamp 16. The bolt 28 extends through body hole 36 of the left wedge assembly 24 and through the elongated body hole 48 of the center wedge assembly 22 to threadingly engage the threaded hole 42 of the right wedge assembly 26.

Figure 3:
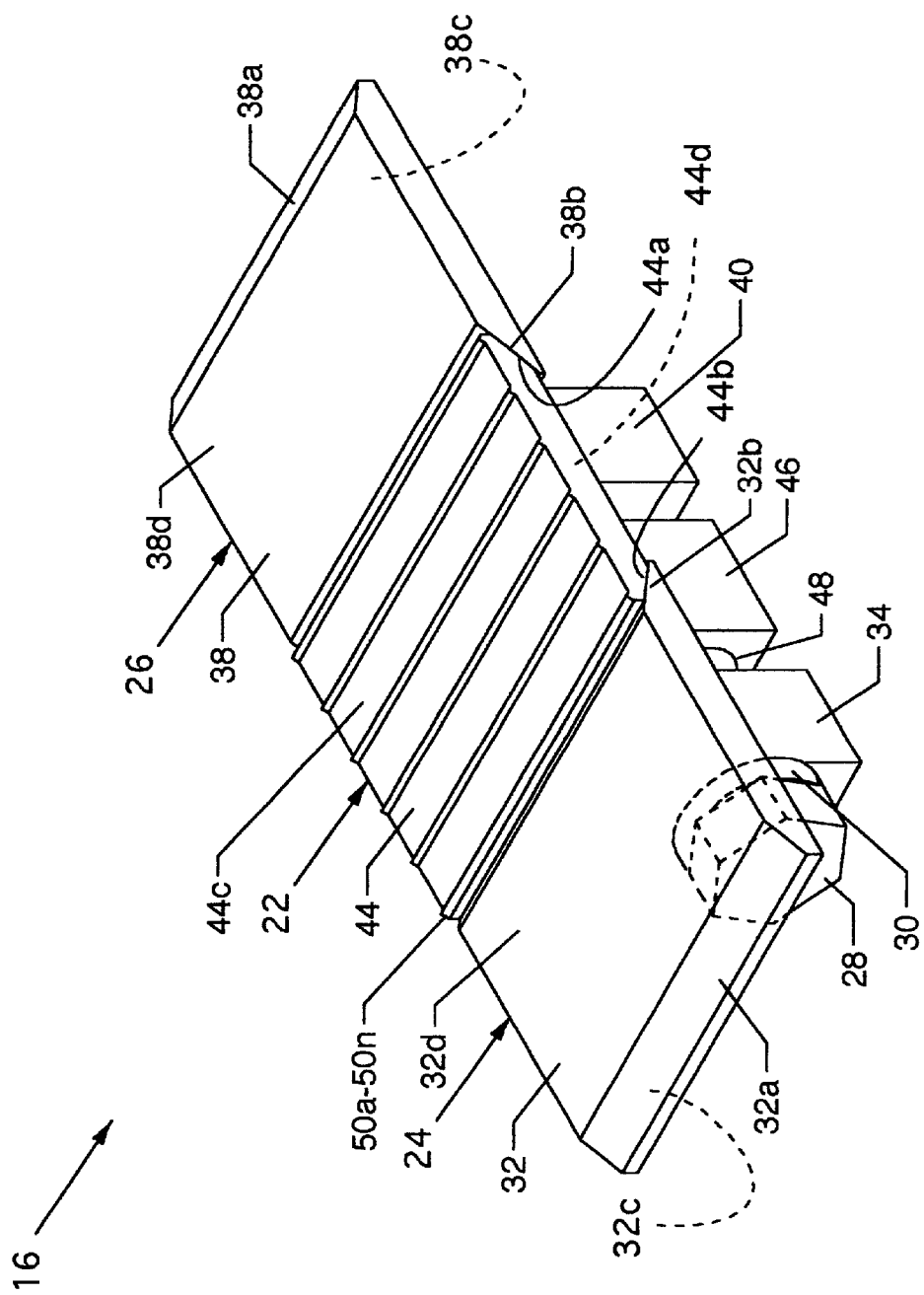
FIG. 3 illustrates the assembled components of FIG. 2.

FIG. 3 illustrates the assembled components of FIG. 2. Insertion of the bolt 28, as previously described, serves to group and align the left wedge 24 assembly, the right wedge 26 assembly and the center wedge assembly 22. When assembled, the left and right wedge assemblies 24 and 26 are urged into close intimate contact with and about the center wedge assembly 22 with the actuation of the bolt 28. Accordingly, the upwardly facing bevel 32b of the left wedge assembly 24 is in intimate contact with the downwardly facing bevel 44b of the center wedge assembly 22, and the upwardly facing bevel 38b of the right wedge assembly 26 is in intimate contact with the downwardly facing bevel 44a of the center wedge assembly 22. Rotary actuation of the bolt 28 in the correct direction draws the left wedge assembly 24 and the right wedge assembly 26 towards each other resulting in the forcing of the center wedge assembly 22 vertically as resultant movement during sliding and forced impingement of the intimately engaged bevels 32b and 44b and the intimately engaged bevels 38b and 44a.

Figure 4:
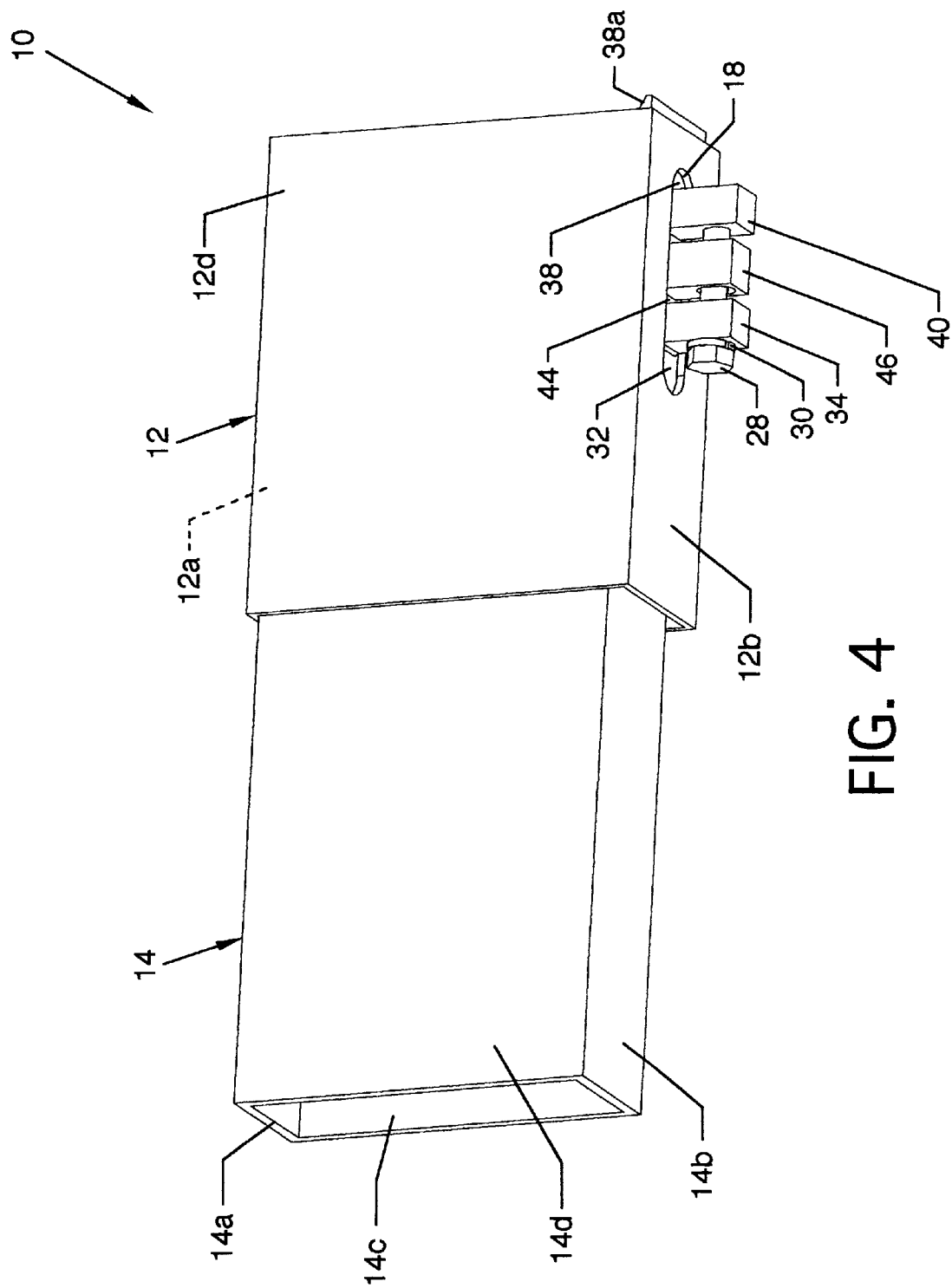
FIG. 4 illustrates an assembled box tube clamping system.

FIG. 4 illustrates an assembled box tube clamping system 10, the present invention. Illustrated in particular are the posts 34, 46 and 40 and the bolt 28 extending through the accommodating elongated hole 18.

Mode of Operation

Figure 5:
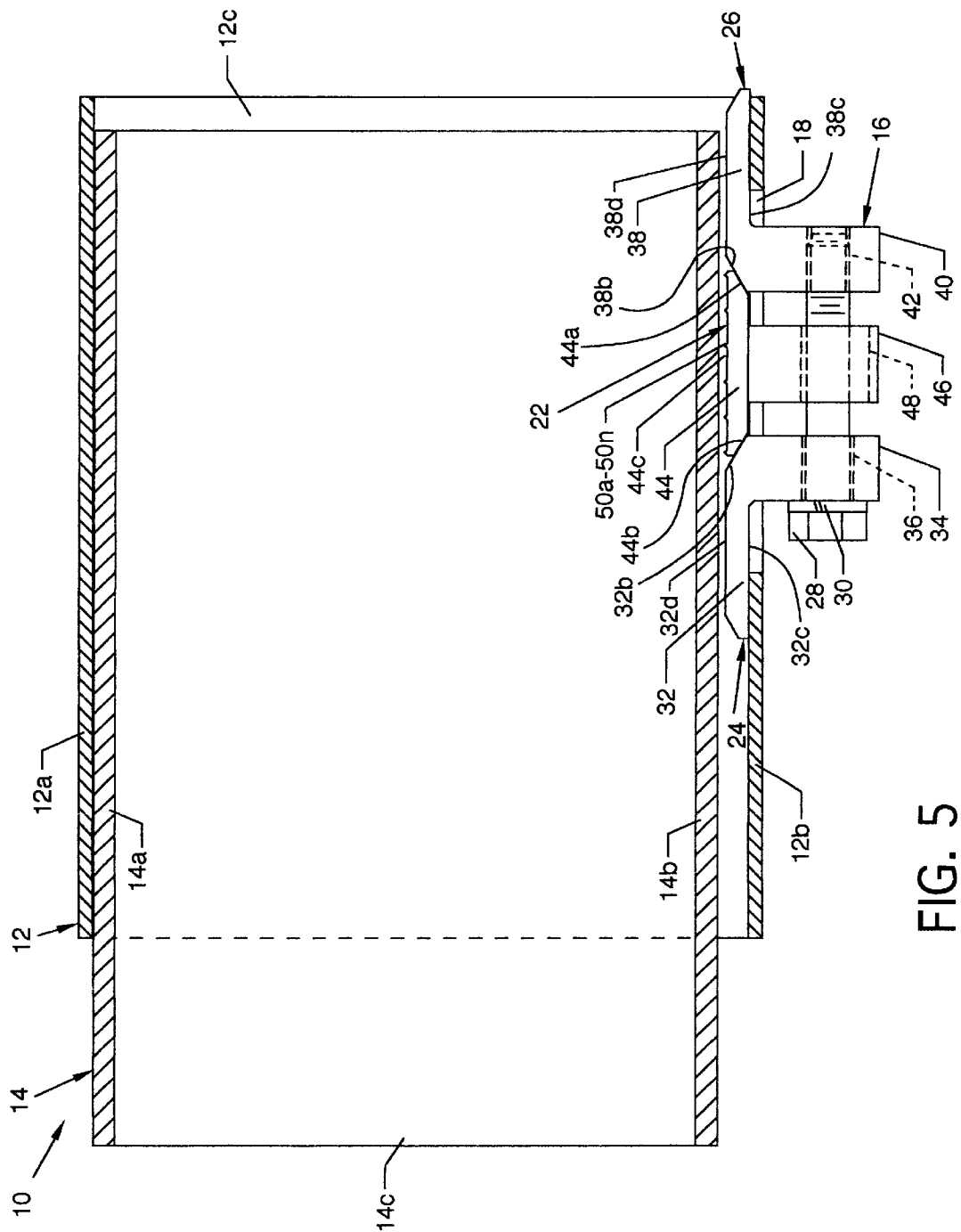
FIG. 5 illustrates a cross section view of the box tube clamping system prior to actuation of the variable geometry clamp to urge the inner and outer box tubes into frictional and mutual engagement.
Figure 6:
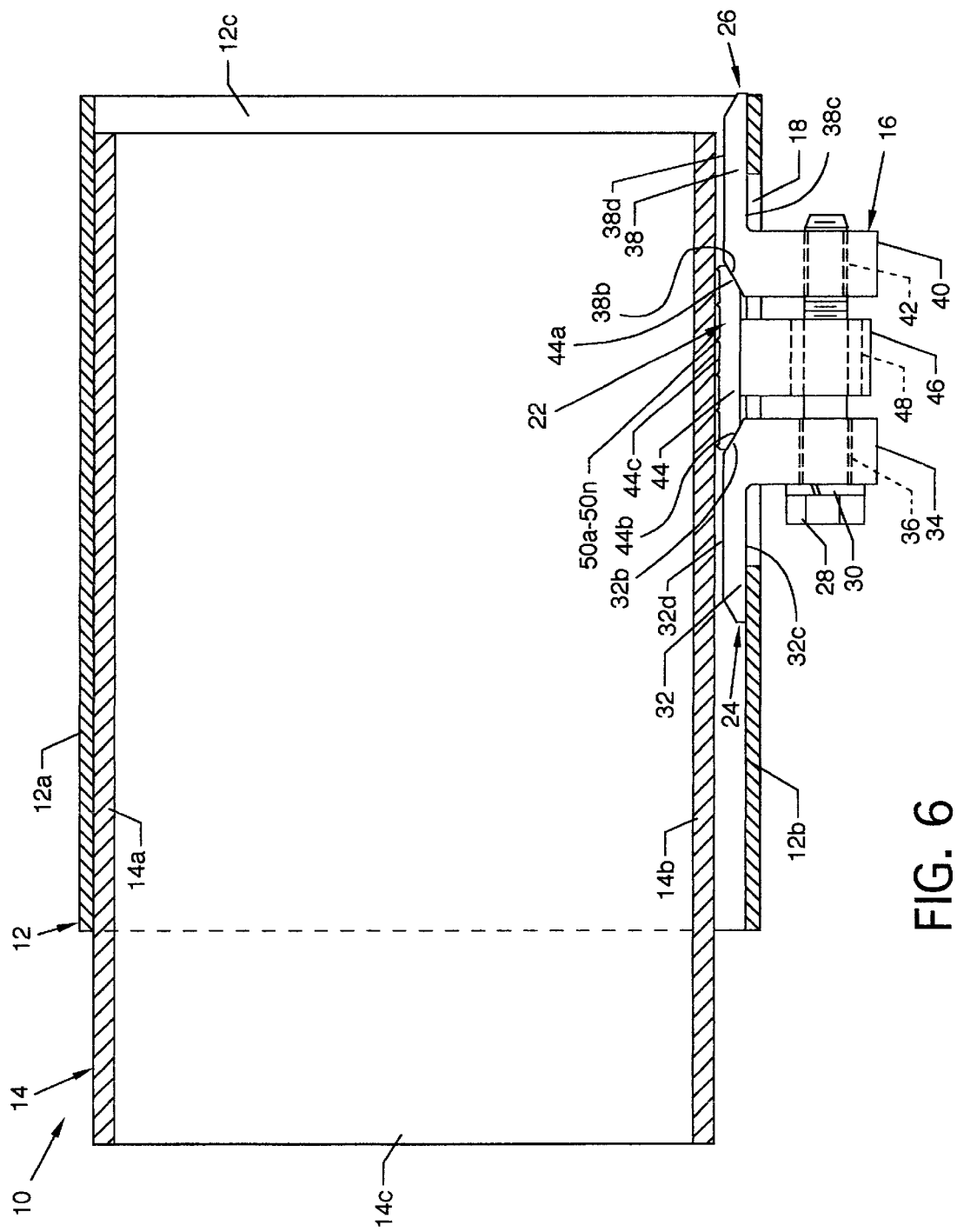
FIG. 6 illustrates a cross section view of the box tube clamping system subsequent to actuation of the variable geometry clamp to urge the inner and outer box tubes into frictional and mutual engagement.

FIGS. 5 and 6 further depict the invention and best illustrate the mode of operation of the box tube clamping system 10. FIG. 5 illustrates a cross section view of the box tube clamping system 10 prior to actuation of the variable geometry clamp 16 to urge the inner and outer box tubes 14 and 12 into frictional and mutual engagement. Prior to any engagement of the inner and outer box tubes 14 and 12, the variable geometry clamp 16 is first placed into the elongated hole 18 located in the lower panel 12b of the outer box tube 12, preferably with the bolt 28 rotated appropriately to cause distanced displacement of the left wedge assembly 24 with respect to the right wedge assembly 26. Such distancing of the left wedge assembly 24 and the right wedge assembly 26 requires that the top surface 32d of the wedge plate 32 and the top surface 38d of the wedge plate 38 are higher than the gripping edges 50a–50n extending upwardly from the top surface 44c of the wedge plate 44. The inner box tube 14 can then be aligned within the outer box tube 12 at any time after suitable placement of the variable geometry wedge 16 into the elongated hole 18. The placement of the variable geometry clamp 16 places the bottom surfaces 32c and 38c of the left wedge plate 32 and right wedge plate 38, respectively, in intimate contact with the upper surfaces of the lower panel 12b at common areas surrounding the elongated hole 18. The bolt 28, the lockwasher 30, and the posts 34, 40 and 46 extend downwardly though the elongated hole 18 and at a sufficient distance beyond the panel 12b to await rotation of the bolt 28 for actuation of the variable geometry clamp 16.

FIG. 6 illustrates a cross section view of the box tube clamping system 10 subsequent to actuation of the variable geometry clamp 16 to urge the inner and outer box tubes 14 and 12 into frictional and mutual engagement. During such actuation, the bolt 28 is rotated in the appropriate direction to draw the left wedge assembly 24 and the right wedge assembly 26 towards each other. As the bolt 28 is rotated, the engagement of the threads of the bolt 28 in intimate engagement with the threads of the threaded hole 42 of the post 40 draws the post 40 along a portion of the elongated hole 18, thus causing the bottom surface 38c of the attached wedge plate 38 to slide longitudinally along the lower panel 12b, as well as along and about a portion of the elongated hole 18, whereby the right wedge assembly 26 is forcibly repositioned towards the left wedge assembly 24. An opposing and simultaneous motion occurs with respect to the left wedge assembly 24. As the bolt 28 is rotated, the engagement of the bolt 28 and lock washer 30 in intimate engagement about the body hole 36 of the post 34 draws the post 34 along a portion of the elongated hole 18, thus causing the bottom surface 32c of the attached wedge plate 32 to slide longitudinally along the lower panel 12b, as well as along and about a portion of the elongated hole 18, whereby the left wedge assembly 24 is forcibly repositioned towards the right wedge assembly 26. As previously described, the upwardly facing bevels 32b and 38b of the wedge plates 32 and 38 are in intimate contact with the downwardly facing bevels 44b and 44a of the wedge plate 44. As the left wedge assembly 24 and the right wedge assembly 26 advance horizontally towards each other, the center wedge assembly 22 is urged and forcibly advanced upwardly by interaction of the advancing and upwardly facing bevels 32b and 38b with the downwardly facing bevels 44b and 44a. The elongated hole 48 in the post 46 allows for movement of the post 46 of the center wedge assembly 22 about the bolt 28. The bolt 28 is rotated until the center wedge assembly 22 ultimately causes intimate forced contact of the gripping edges 50a–50n with the lower panel 14b and resultant intimate forced planar contact of the upper panel 14a of the inner box tube 14 with the upper panel 12a of the outer box tube 12. Although the use of one variable geometry clamp 16 is described, a plurality of variable geometry clamps 16 could be utilized should additional clamping be desired for the joining of box tubes being of greater length or weight. The joining of box tubes is demonstrated in the invention; however, other tubes or structures could be joined incorporating the teachings of the invention such as, but not limited to, joining dimension lumber to an outer box tube, joining fiber glass railroad crossing arms to an outer box tube, joining an I-beam to an outer box tube, or joining a round inner tube to a rectangular or round shaped tube. Modification of the shape of the wedge plates, such as to provide curved or arced wedge plates or other geometric configurations, shall not be deemed as limiting to the scope of the invention.

First Alternative Embodiment

Figure 7:
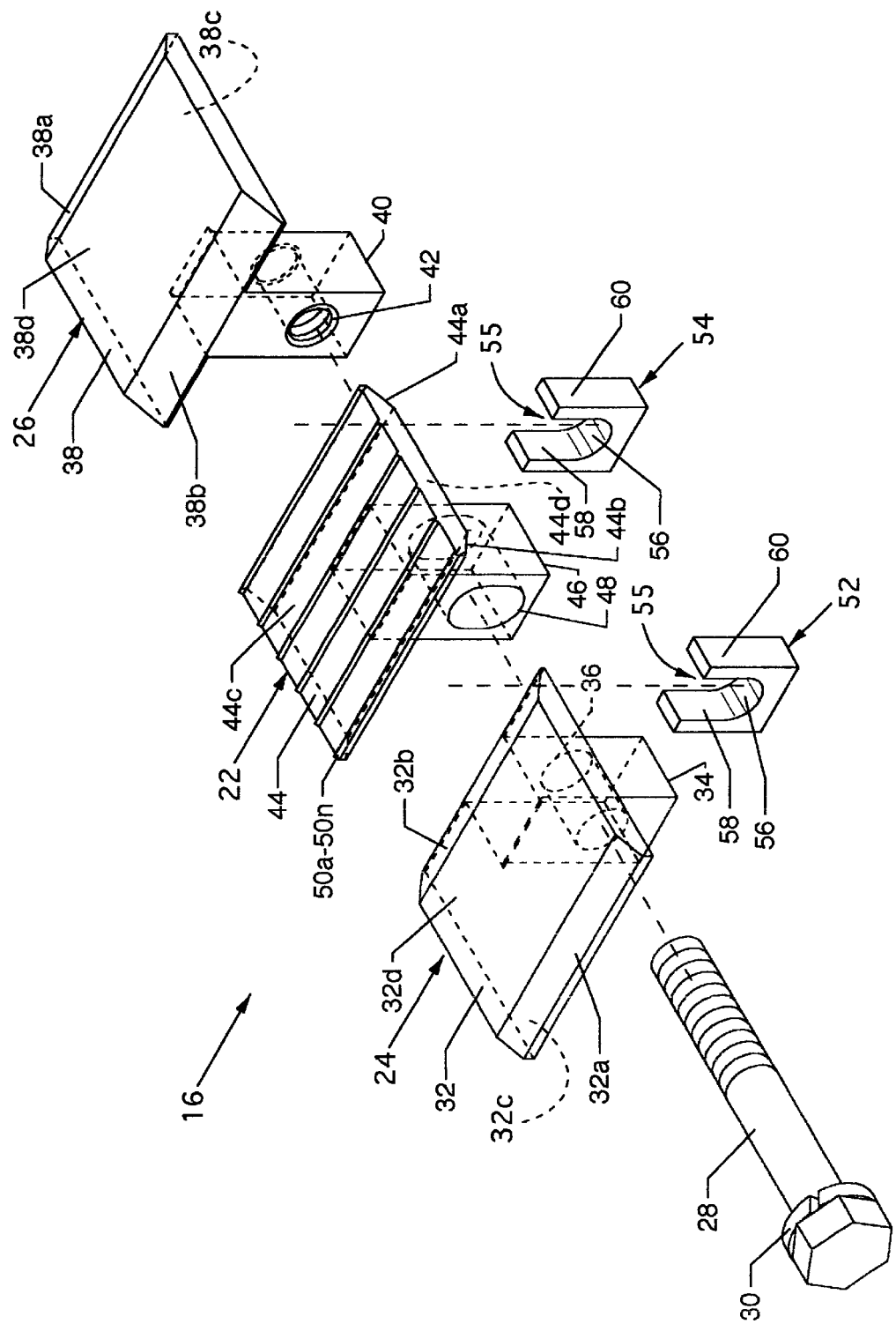
FIG. 7, a first alternate embodiment, is an exploded isometric view of the variable geometry clamp of FIG. 2, including installation spacers.
Figure 8:
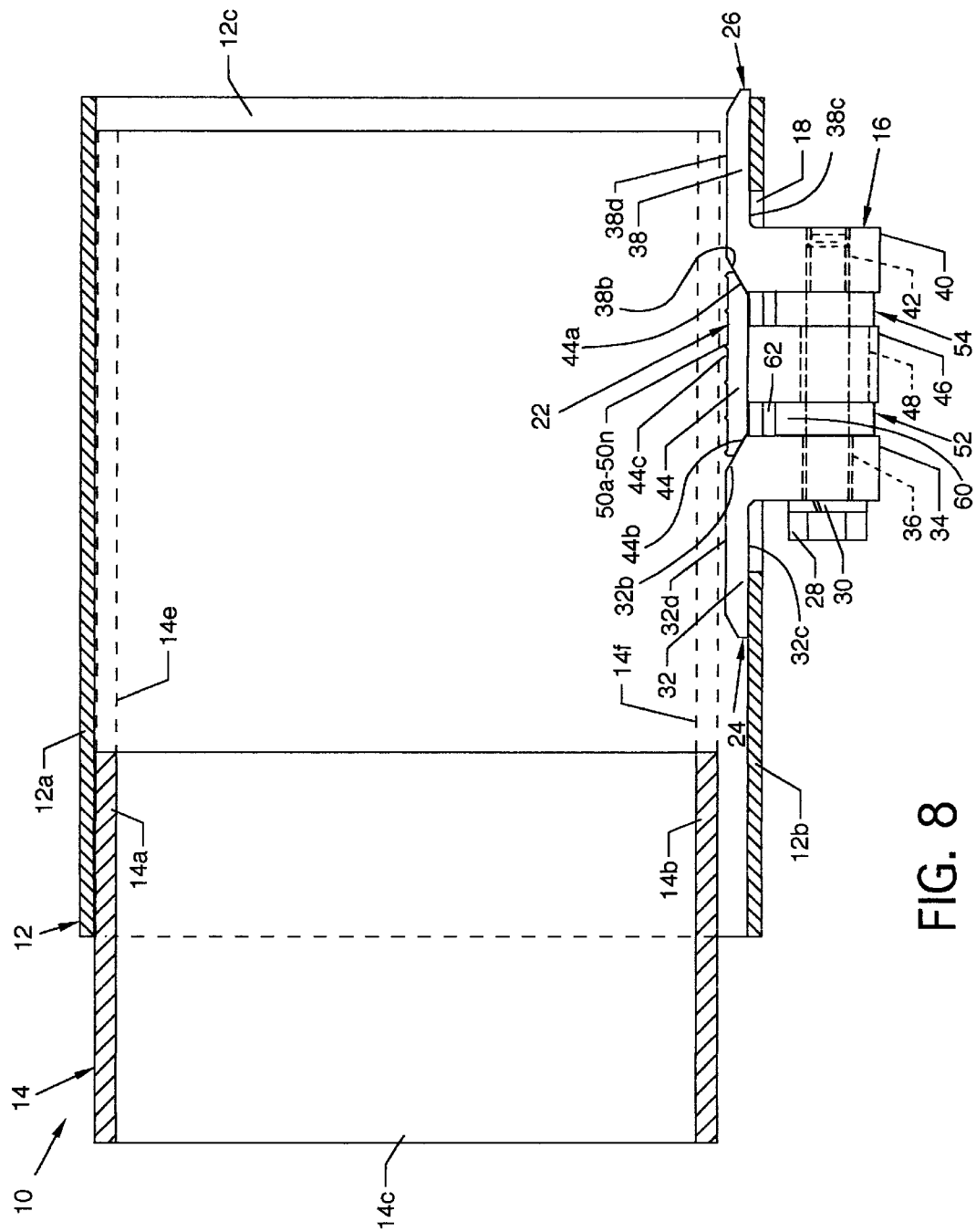
FIG. 8 illustrates a cross section view of the box tube clamping system showing partial insertion of the inner box tube into the outer box tube and showing the use of installation spacers in the variable geometry clamp; and, FIG. 9 is a cross section view showing the disengagement of the installation spacers from the variable geometry clamp.

FIG. 7, a first alternative embodiment, illustrates an exploded isometric view of the variable geometry clamp 16 shown with similarly constructed installation spacers 52 and 54. Each of the installation spacers 52 and 54 is fashioned preferably of a plastic, such as a polycarbonate available under the registered trademark LEXAN, or of other suitable plastic or other material, and can be utilized to facilitate and promote substantially unrestricted entry of the inner box tube 14 within the outer box tube 12, as shown in FIG. 8, without significant interference from the variable geometry clamp 16. The use of the installation spacers 52 and 54 ensures that a low and orderly profile of the variable geometry clamp 16 is maintained during insertion of the inner box tube 14 into the outer box tube 12. Each of the installation spacers 52 and 54 is U-shaped and each includes a slot 55 formed by an arcuate surface 56 having vertically aligned wall extensions 58 and 60 extending upwardly therefrom. Installation spacer 52 aligns as a spacer between the post 34 of the left wedge assembly 24 and the post 46 of the center wedge assembly 22 and over and about a portion of the bolt 28 which is accommodated by the slot 55. In a similar fashion, the installation spacer 54 aligns as a spacer between the post 46 of the center wedge assembly 22 and the post 40 of the right wedge assembly 26 and over and about a portion of the bolt 28 which is accommodated by the slot 55.

FIG. 8 illustrates a cross section view of the box tube clamping system 10 showing partial insertion of the inner box tube 14 within the outer box tube 12 prior to actuation of the variable geometry clamp 16 to urge the inner and outer box tubes 14 and 12 into frictional mutual engagement. Dashed line pairs show the insertional paths 14e and 14f of the inner box tube 14. Prior to any engagement of the inner and outer box tubes 14 and 12, the variable geometry clamp 16 utilizing the installation spacers 52 and 54, which maintain a low and orderly variable geometry clamp 16 profile, is first placed into the elongated hole 18 located in the lower panel 12b of the outer box tube 12. The installation spacers 52 and 54 are placed as described previously in FIG. 7 between the posts 34, 46 and 40 and over portions of the bolt 28 with the bolt 28 being rotatingly positioned to cause the alternatingly spaced posts 34, 46 and 40 and the alternatingly spaced and appropriately dimensioned installation spacers 52 and 54 to draw together until the bolt 28 is prevented from further rotation by the compressed geometry of the posts 34, 46 and 40 and the interposed installation spacers 52 and 54. The longitudinal dimensioning or thickness of the installation spacers 52 and 54 is such that upon full tightening of the bolt 28, the upward travel of the center wedge assembly 22 is limited as the travel of the left wedge assembly 24 and the right wedge assembly 26 is restricted. The inner box tube 14 can be aligned fully within the outer box tube 12 at any time after suitable placement of the variable geometry wedge 16 utilizing installation spacers 52 and 54 into the elongated hole 18.

Figure 9:
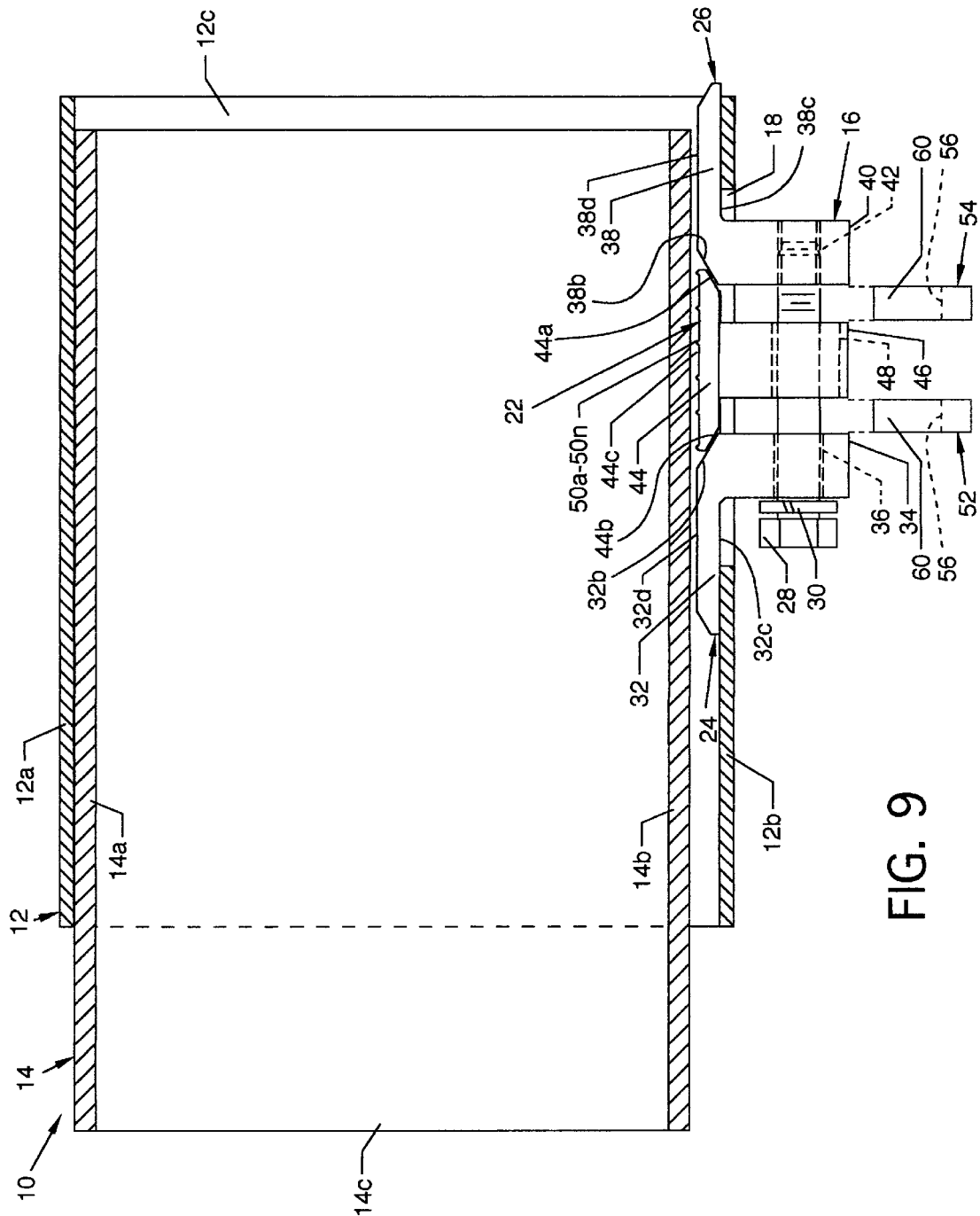

With respect to the removal of the installation spacers 52 and 54, as depicted in FIG. 9, it is to be noted that the vertical dimensions of the installation spacers 52 and 54 are such that spaces, such as the immediately viewable and near space 62, are located between the upper portions of the wall extensions 58 and 60 and the areas of the lower panel 12b surrounding the elongated hole 18. If required, a prying member such as a screwdriver can be inserted into such spaces to pryingly urge the installation spacer 52 from between the post 34 and the post 46 and the installation spacer 54 from between the post 46 and the post 40 in the event that a slightly oversized inner box tube 14 causes resistance to suitable retractive rotation of the bolt 28.

FIG. 9 illustrates a cross section view of the box tube clamping system 10 where the inner box tube 14 has been fully advanced within the outer box tube 14 and advanced along and past the noninterferring variable geometry clamp 16. Subsequently, the bolt 28 is then rotatingly actuated (as shown) to relieve the compression along the alternatingly spaced posts 34, 46 and 40 and the alternatingly spaced installation spacers 52 and 54 prior to actuation of the variable geometry clamp 16 for engagement with the inner box tube 12. Compressional relief allows the installation spacers 52 and 54 to disengage from frictional engagement between the respective posts 34, 46 and 40 and to be released from the structure of the variable geometry clamp 16. The bolt 28 is then actuated to force the center wedge assembly 22 upwardly to engage the inner box tube 14 and thus join the inner box tube 14 with the outer box tube 12, as previously described.

Various modifications can be made to the present invention without departing from the apparent scope hereof.

| BOX TUBE CLAMPING SYSTEM PARTS LIST | |
|---|---|
| 10 | box tube clamping system |
| 12 | outer box tube |
| 12a | upper panel |
| 12b | lower panel |
| 12c–d | side panels |
| 14 | inner box tube |
| 14a | upper panel |
| 14b | lower panel |
| 14c–d | side panels |
| 14e–f | insertional paths |
| 16 | variable geometry clamp |

-continued

BOX TUBE CLAMPING SYSTEM PARTS LIST

| | |
|---|---|
| 18 | elongated hole |
| 22 | center wedge assembly |
| 24 | left wedge assembly |
| 26 | right wedge assembly |
| 28 | bolt |
| 30 | lock washer |
| 32 | wedge plate |
| 32a–b | bevels |
| 32c | bottom surface |
| 32d | top surface |
| 34 | post |
| 36 | body hole |
| 38 | wedge plate |
| 38a–b | bevels |
| 38c | bottom surface |
| 38d | top surface |
| 40 | post |
| 42 | threaded hole |
| 44 | wedge plate |
| 44a–b | bevels |
| 44c | top surface |
| 44d | bottom surface |
| 46 | post |
| 48 | elongated body hole |
| 50a–n | gripping ridges |
| 52 | installation spacer |
| 54 | installation spacer |
| 55 | slot |
| 56 | arcuate surface |
| 58 | wall extension |
| 60 | wall extension |
| 62 | space |

What is claimed is:

1. A variable geometry clamp, comprising:
a. a center wedge assembly flanked by a left wedge assembly and a right wedge assembly;
b. the center wedge assembly including a wedge plate having a top surface, a bottom surface, and opposing downwardly facing left and right bevels extending from the top surface to the bottom surface and converging toward each other;
c. the left wedge assembly including a wedge plate having a top surface, a bottom surface, and an upwardly facing bevel extending from the bottom surface to the top surface which mates with and slides against the left downwardly facing bevel of the wedge plate of the center wedge assembly;
d. the right wedge assembly including a wedge plate having a top surface, a bottom surface, and an upwardly facing bevel extending from the bottom surface to the top surface which mates with and slides against the right downwardly facing bevel of the wedge plate of the center wedge assembly;
e. the wedge plates of the center, left, and right wedge assemblies each having a post extending downwardly from and perpendicular to the bottom surface thereof, and each of the posts having a bolt hole, the bolt holes being aligned with each other; and,
f. a bolt received in the aligned bolt holes for use in altering the geometry of the clamp by urging the center, left, and right wedge assemblies toward one another so as to bring the respective mating bevels into engagement and thereby force the center wedge assembly upwardly.

2. The variable geometry clamp as defined in claim 1, wherein the top surface of the wedge plate of the center wedge assembly has a plurality of gripping ridges thereon.

3. The variable geometry clamp as defined in claim 1, wherein the top and bottom surfaces of each of the wedge plates of the center, left, and right wedge assemblies are planar.

4. The variable geometry clamp as defined in claim 1, and further including spacers located about the bolt in the regions between the posts.

5. The variable geometry clamp as defined in claim 1, wherein each of the wedge plates of the center, left, and right wedge assemblies is rectangular in configuration.

6. A box tube clamping system, comprising:
a. an outer box tube with an elongated hole in a wall portion thereof;
b. an inner box tube of the same shape as the outer box tube but being of smaller size than the outer box tube, an end of the inner box tube being fitted into an end of the outer box tube and extending over the elongated hole in the outer box tube with a clearance space existing between the outer surface of the inner box tube and the inner surface of the outer box tube;
c. a variable geometry clamp for rigidly coupling the inner box tube to the outer box tube, the variable geometry clamp having a left wedge assembly, a center wedge assembly, and a right wedge assembly aligned in a straight line and positioned over the elongated hole in the outer box tube, and each of the left, center, and right wedge assemblies including a wedge plate, the wedge plate of the center wedge assembly having downwardly facing bevels at opposite ends thereof, and the wedge plates of the left and right wedge assemblies each having an upwardly facing bevel, the upwardly facing bevel of the wedge plate of the left wedge assembly bearing against the downwardly facing bevel at one end of the wedge plate of the center wedge assembly, and the upwardly facing bevel of the wedge plate of the right wedge assembly bearing against the downwardly facing bevel at the opposite end of the wedge plate of the center wedge assembly;
d. separate posts extending from each of the wedge plates of the left, center, and right wedge assemblies through the elongated hole in the wall portion of the outer box tube, each of the posts having a bolt hole, the bolt holes being aligned with each other; and,
e. a bolt received in the aligned bolt holes for use in drawing the left and right wedge assemblies toward the center wedge assembly to cause the upwardly facing bevels of the wedge plates of the left and right wedge assemblies to slide against the downwardly facing bevels of the wedge plate of the center wedge assembly and thereby force the center wedge assembly against the outer surface of the inner box tube to lock the outer and inner box tubes to each other.

7. The box tube clamping system as defined in claim 6, wherein the wedge plate of the center wedge assembly has a plurality of gripping ridges engaging the outer surface of the inner box tube.

8. The box tube clamping system as defined in claim 6, wherein each of the wedge plates of the left, center, and right wedge assemblies is rectangular.

* * * * *